United States Patent [19]

Tamai et al.

[11] Patent Number: 5,291,413
[45] Date of Patent: Mar. 1, 1994

[54] NAVIGATION SYSTEM FOR GUIDING A VEHICLE ALONG A PRECOMPUTED OPTIMAL ROUTE

[75] Inventors: Haruhisa Tamai, Sunnyvale, Calif.; Tatsuhiko Abe, Saitama, Japan

[73] Assignee: Zexel Corporation Daihatsu-Nissan Ikebukuro, Tokyo, Japan

[21] Appl. No.: 868,411

[22] Filed: Apr. 14, 1992

[51] Int. Cl.[5] .............................................. G06F 15/50
[52] U.S. Cl. ................... 364/449; 364/444; 340/990; 340/995
[58] Field of Search ........................ 364/443, 444, 449; 73/178 R; 340/988, 990, 995

[56] References Cited

U.S. PATENT DOCUMENTS

| | | | |
|---|---|---|---|
| 4,796,189 | 1/1989 | Nakayama et al. | 340/990 |
| 4,926,336 | 5/1990 | Yamada | 364/449 |
| 4,937,753 | 6/1990 | Yamada | 340/990 |
| 4,954,959 | 9/1990 | Moroto et al. | 364/449 |
| 4,984,168 | 1/1991 | Neukrichner et al. | 364/449 |
| 5,036,471 | 7/1991 | Tamura et al. | 364/449 |
| 5,041,983 | 8/1991 | Nakahara et al. | 364/449 |
| 5,107,433 | 4/1992 | Helldörfer et al. | 340/990 |

*Primary Examiner*—Gary Chin
*Attorney, Agent, or Firm*—Thomas R. Morrison

[57] ABSTRACT

A navigation system prevents a vehicle from deviating from a new optimal route immediately after the new optimal route has been computed following the first deviation of the vehicle from an original optimal route. The system does this by determining the present location of the vehicle and searching road network data in a map database for a plurality of locations that are farther away from the present location than a distance travelled by the vehicle during recomputation of a new optimal route. These locations are selected as candidate new starting points. Then the system recomputes an optimal route from each of the candidate starting points to the destination. After the recomputation, the present location of the vehicle is read into the system, and an optimal route from the present location to each candidate starting point is computed. From the plurality of optimal routes from the present location of the vehicle to the destination via respective candidate starting points, the route that satisfies such conditions as, for example, to reach the destination by the shortest distance, in the shortest time, is selected as the new optimal route.

25 Claims, 5 Drawing Sheets

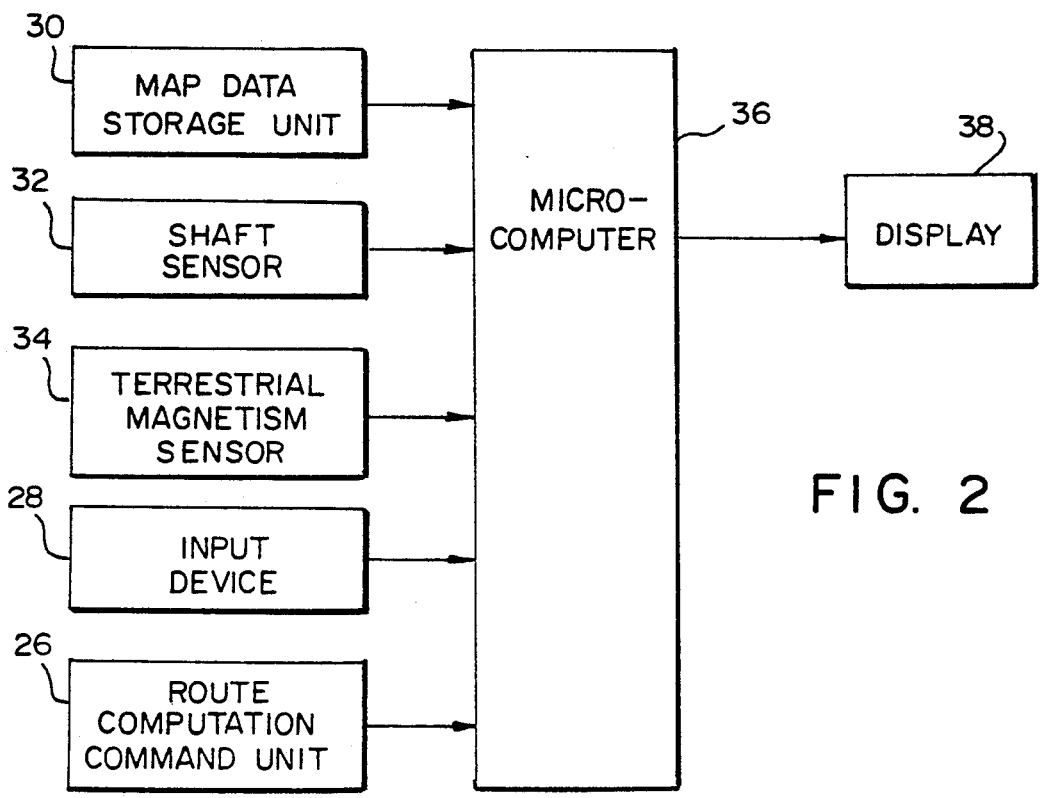
FIG. 2
FIG. 3A
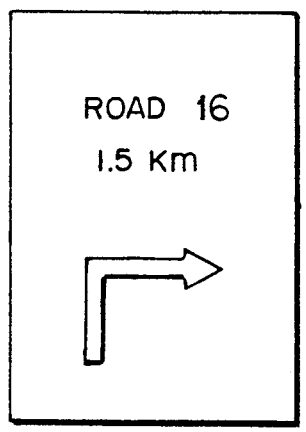
FIG. 3B
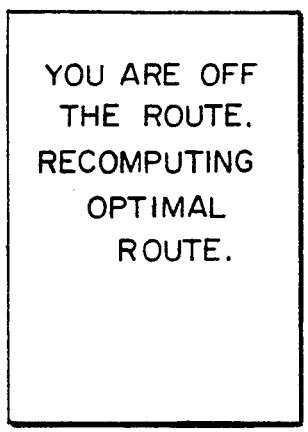
FIG. 3C
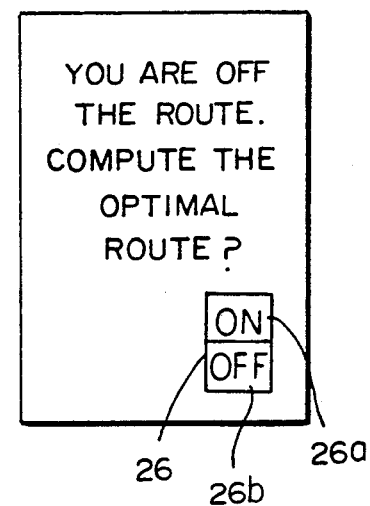

NAVIGATION SYSTEM FOR GUIDING A VEHICLE ALONG A PRECOMPUTED OPTIMAL ROUTE

BACKGROUND OF THE INVENTION

The present invention relates to vehicle navigation systems, and, more particularly, to a system for guiding a vehicle along an optimal route that has been computed beforehand.

Generally, a vehicle navigation system computes from map data the optimal route from a starting point to a destination before starting a journey. En route, the system computes local directions along the optimal route with reference to the vehicle's present location in real time. The system guides the vehicle's navigation from a starting point to a destination by displaying route information in real time on a CRT.

When a vehicle travels, it sometimes deviates from the optimal route. For example, assume a vehicle is traveling on a road in a particular direction. A route guidance display instructs the driver to turn right where the road he is on intersects a second road at right angles. However, the driver cannot make the turn because the second road is under construction. In such a case, the driver is forced to travel straight along the road he is on, without turning to the right at the next intersection. Thus the vehicle has deviated from the optimal route.

Under such circumstances, conventional navigation systems require a manual operation to recompute a new optimal route from a new starting point to the destination. The recomputation takes the vehicle's present location at the time of the manual operation as the starting point.

However, conventional vehicle navigation systems can present a problem when a vehicle is off a new optimal route at the time when or immediately after its computation is completed.

Computation of an optimal route generally requires several seconds. Therefore, when a vehicle keeps on traveling after it has deviated, it moves forward by distance L from the new starting point during the time the new optimal route is computed, where L is given by the equation $$L = V \times T,$$

where V = the velocity of the vehicle and T = the time to compute the new optimal route.

Should the recomputed optimal route require a right-turn at a second intersection where the road currently traveled intersects a third road, the vehicle has passed through the second intersection if the distance between the first and second intersections is shorter than the distance L. As a result, the vehicle is once more off the optimal route, which must be again recomputed in response to a manual operation by the driver. This is a great inconvenience for the driver.

On the other hand, should the new optimal route require driving straight through the next intersection, instead of the right turn required by the original optimal route, the vehicle may turn right at the intersection before the new optimal route is computed, resulting in another deviation.

OBJECTS AND SUMMARY OF THE INVENTION

An object of the present invention is to provide a navigation system that overcomes the drawbacks of the prior art.

A further object of the present invention is to provide a system that can prevent another deviation from the optimal route immediately after recomputation of an optimal route as a result of the vehicle's deviation from the original optimal route.

Briefly stated, the present invention provides a navigation system that prevents a vehicle from deviating from a new optimal route immediately after the new optimal route has been computed following the first deviation of the vehicle from an original optimal route. The system does this by determining the present location of the vehicle and searching road network data in a map database for a plurality of locations that are farther away from the present location than a distance travelled by the vehicle during recomputation of a new optimal route. These locations are selected as candidate new starting points. Then the system recomputes an optimal route from each of the candidate starting points to the destination. After the recomputation, the present location of the vehicle is read into the system, and an optimal route from the present location to each candidate starting point is computed. From the plurality of optimal routes from the present location of the vehicle to the destination via respective candidate starting points, the route that satisfies such conditions as, for example, to reach the destination by the shortest distance, in the shortest time, is selected as the new optimal route.

According to an embodiment of the invention, a vehicle navigation system comprises: means for storing and retrieving map data; first means for detecting a present location of a vehicle; means for computing from the map data an original optimal route for the vehicle from a starting point to a destination; second means for detecting a deviation of the vehicle from the original optimal route; first means for selecting a plurality of possible new starting points by searching the map data; each of the new starting points being located on a different road; each of the new starting points being located at a distance greater than a specified distance from the present location of the vehicle; the means for computing including means for computing a plurality of new optimal routes from each of the possible new starting points to the destination; second means for selecting a single new optimal route from among the plurality of new optimal routes; and the second means for selecting including means for selecting the single new optimal route when the second means for detecting detects that the vehicle is off the optimal route.

According to a feature of the invention, a vehicle navigation system comprises: means for storing and retrieving map data; first means for detecting a present location of a vehicle; means for computing from the map data an original optimal route for the vehicle from a starting point to a destination; second means for detecting a deviation of the vehicle from the original optimal route; means, responsive to the second means for detecting, for displaying an indication that the vehicle is off the original optimal route; means for sending a command signal manually; first means, responsive to the command signal, for selecting a plurality of possible new starting points by searching the map data; each of the new starting points being located on a different road; each of the new starting points being located at a distance greater than a specified distance from the present location of the vehicle; the means for computing including means for making a first computation of a plurality of new optimal routes from each of the possible new starting points to the destination; second means for selecting a single new optimal route from among the plurality of new optimal routes; and the second means for selecting including means for selecting the single new optimal route when the second means for detecting detects that the vehicle is off the optimal route.

According to another feature of the invention, a vehicle navigation system comprises: a CD ROM for storing and retrieving map data; a shaft sensor; a terrestrial magnetism sensor; the shaft sensor and the terrestrial magnetism sensor cooperating to detect a present location of a vehicle; a microcomputer for computing from the map data an original optimal route for the vehicle from a starting point to a destination; the shaft sensor, the terrestrial magnetism sensor, and the microcomputer cooperating to detect a deviation of the vehicle from the original optimal route; the microcomputer including means for selecting a plurality of possible new starting points by searching the map data; each of the new starting points being located on a different road; each of the new starting points being located at a distance greater than a specified distance from the present location of the vehicle; the microcomputer including means for computing a plurality of new optimal routes from each of the possible new starting points to the destination; the microcomputer including means for selecting a single new optimal route from among the plurality of new optimal routes; and the microcomputer including means for selecting the single new optimal route when the shaft sensor, the terrestrial magnetism sensor, and the microcomputer cooperate to detect that the vehicle is off the optimal route.

According to still another feature of the invention, a vehicle navigation system comprises: a CD ROM for storing and retrieving map data; a shaft sensor; a terrestrial magnetism sensor; the shaft sensor and the terrestrial magnetism sensor cooperating to detect a present location of a vehicle; a microcomputer for computing from the map data an original optimal route for the vehicle from a starting point to a destination; the shaft sensor, the terrestrial magnetism sensor, and the microcomputer cooperating to detect a deviation of the vehicle from the original optimal route; the microcomputer including means for signalling the deviation; a CRT display for displaying information; the CRT including means for indicating that the vehicle is off the original optimal route when the microcomputer signals the deviation; a manually operated switch for sending a command signal; the microcomputer including means for selecting a plurality of possible new starting points by searching the map data; each of the new starting points being located on a different road; each of the new starting points being located at a distance greater than a specified distance from the present location of the vehicle; the microcomputer being responsive to the command signal; the microcomputer including means for computing a plurality of new optimal routes from each of the possible new starting points to the destination; the microcomputer including means for selecting a single new optimal route from among the plurality of new optimal routes; and the microcomputer including means for selecting the single new optimal route when the shaft sensor, the terrestrial magnetism sensor, and the microcomputer cooperate to detect that the vehicle is off the optimal route.

The above, and other objects, features and advantages of the present invention will become apparent from the following description read in conjunction with accompanying drawings, in which like reference numerals designate the same elements.

BRIEF DESCRIPTION OF THE DRAWINGS

FIG. 2 is a schematic view of an embodiment of the present invention.

FIG. 3 shows information to be displayed on the screen of the display. FIG. 3(A) represents an example of local navigation guidance, and FIGS. 3(B) and 3(C) respectively represent examples of information that indicates a vehicle is off the optimal route.

DETAILED DESCRIPTION OF THE PREFERRED EMBODIMENTS

Figure 1:
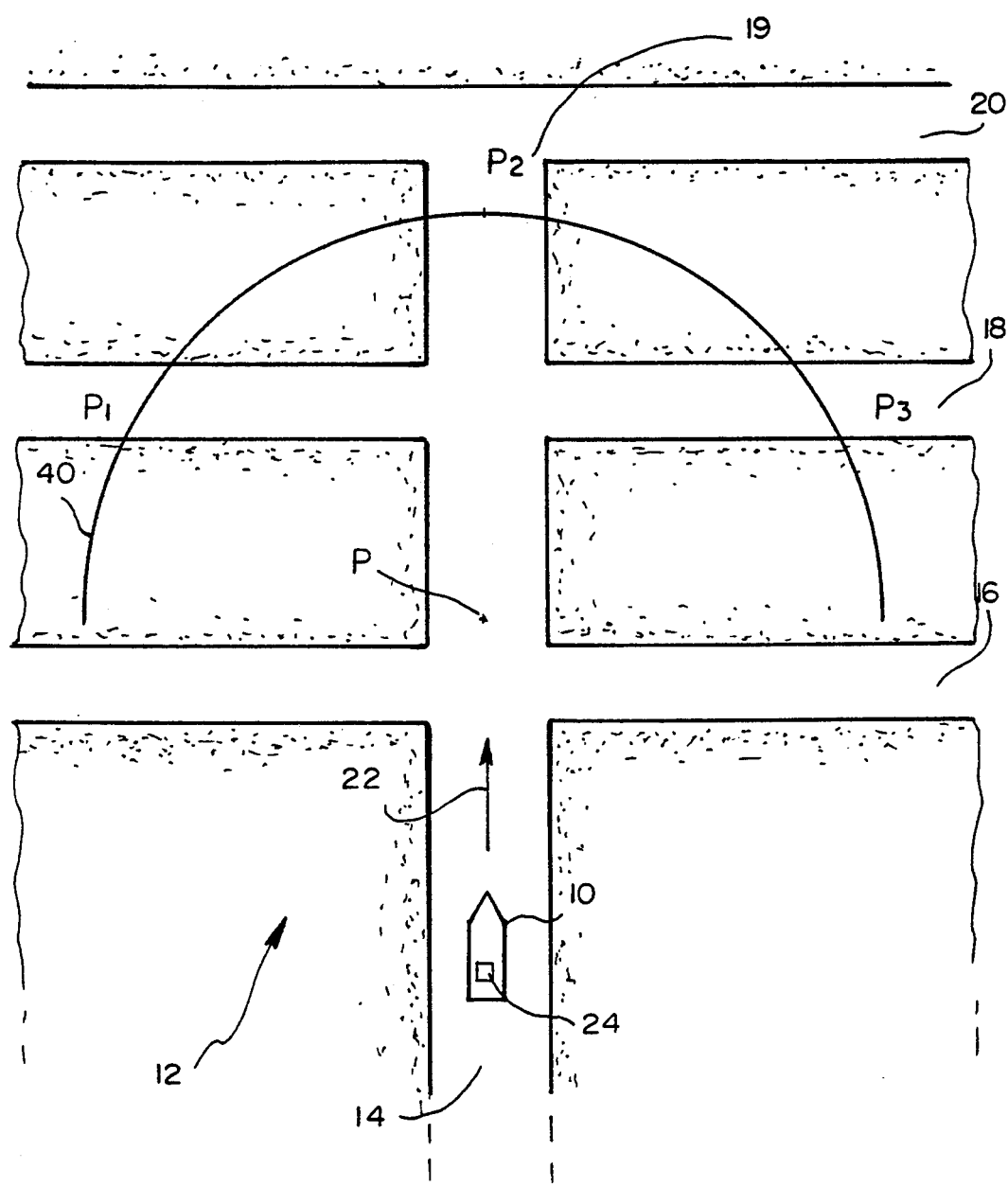
FIG. 1 is a simplified plan view of a vehicle moving over a road network. The vehicle has installed a navigation system of the present invention.

Referring to FIG. 1, a vehicle 10 moves over a road network 12, consisting of a plurality of roads 14–20, in the direction shown by an arrow 22. Road 14 intersects road 20 at intersection 19. Vehicle 10 has installed therein a navigation system 24 that contains the apparatus of the present invention.

Referring to FIG. 2, a driver of vehicle 10 initiates computation of an optimal route in navigation system 24 by energizing a route computation command switch 26. Together with the instruction to compute, the driver enters route data through input device 28. This data always specifies a destination; it may or may not specify a starting location. From two inputs: map data, retrieved from a map data storage unit 30, and either present location data, communicated from a shaft sensor 32 and a terrestrial magnetism sensor 34, or a specified starting location, entered by the driver into input device 28, a microcomputer 36 computes the optimal route. Microcomputer 36 also computes guidance for following the optimal route. The guidance is sent to display 38 for presentation to the driver.

Map data storage unit 30 may be a CD-ROM or IC cards containing map data, including road network data and address data. Input device 28 is comprised of a keyboard or other similar device for entering destinations and other data necessary for navigation.

As shown in FIG. 3(C), route computation command switch 26 consists of ON switch 26a and OFF switch 26b, which may be provided in the form of touch-sensitive keys on the screen of display 38.

Microcomputer 36 computes the velocity of and accumulated distance travelled by vehicle 10 from signals from shaft sensor 32. Microcomputer 36 also computes the forward direction of the vehicle from signals from terrestrial magnetism sensor 34. Then, based on accumulated travel distance and the heading of vehicle 10, microcomputer 36 computes vehicle 10's present location.

Present location of vehicle 10 may also be computed from the GPSS (Global Positioning System with Satellite), using three or four satellites.

Microcomputer 36 also computes, from map data in map data storage unit 30, an optimal route from a starting point to a destination. The optimal route is computed to minimize the time or the distance from a starting point to a destination or to require the fewest number of right and left turns.

Vehicle 10's destination is entered from input device 28. A starting point may also be entered from input device 28. If it is not so entered, vehicle 10's present location becomes the starting point. However, when an optimal route is recomputed as described below, the present location of vehicle 10 is always the starting point.

Microcomputer 36 computes local route information along the optimal route and sends this information to display 38. Display 38 then presents the information as an image on the screen. In this application, route information means the information required to guide vehicle 10 from its starting point to its destination along the optimal route. In the present embodiment, route information displayed comprises, as shown in FIG. 3(A), the name of the road into which vehicle 10 should turn immediately it leaves the road currently traversed (e.g., Road 16 as in FIG. 3(A)), a distance between vehicle 10's present location and the next road (e.g., 1.5 km.), and an arrow representing the direction of the turn into the next road. Route information is continuously recomputed and updated from the present location of vehicle 10 as it travels. Under normal conditions, an image on display 38 is updated immediately after vehicle 10 proceeds into the road whose name has just been displayed.

Local navigational guidance is thus presented from vehicle 10's starting point to the destination by repeating the above procedure. However, display of the distance from the present location of vehicle 10 to the next road is updated only at specified intervals, for example, every 500 m, according to the present embodiment.

Further, route information need not be limited to a road name, a distance, and an arrow, as shown in FIG. 3(A). It may include other information in addition thereto, or it may instead comprise entirely different information. The display may be voice instead of image, or voice and image may be jointly presented.

Microcomputer 36 also determines, from vehicle 10's present location and its present optimal route, whether vehicle 10 is on or off the optimal route. If vehicle 10 has deviated from the optimal route it was following, microcomputer 36 determines a new optimal route. It does so by selecting a plurality of possible locations for a new starting point, computing respective optimal routes from the possible locations to the destination, and selecting a single optimal route from among the plurality of computed optimal routes.

Selecting possible locations proceeds as follows. The travelling speed of vehicle 10 at the time it deviated from the optimal route is computed from signals from shaft sensor 22. A time T required to compute a new optimal route is computed from the straight-line distance from vehicle 10's present location to its destination. And a distance L travelled by vehicle 10 while a new optimal route is computed is also computed. A distance D longer than distance L is calculated from distance L by either adding or multiplying a specified distance. Then a search of road networks in the map data in map data storage unit 30 yields all the locations that vehicle 10 can reach by traveling distance D from its present location.

These locations naturally include those in a direction opposite to the direction in which vehicle 10 is travelling. However, possible locations may be limited to those in a direction forward of vehicle 10 in case routes that require a U-turn should be excluded.

Selecting possible locations in accordance with the present embodiment proceeds as follows. Referring to FIG. 1, vehicle 10, which has been moving in the direction shown by arrow 22, deviates from the optimal route at point A. To pick out possible locations for a new starting point, a semicircle 40, the forward half of a circle of radius R, is drawn on the road network data of map data storage unit 30 with point A as the center. R is shorter than L. Points $P_1, P_2, \ldots, P_n$ ($n=3$ in case of the present embodiment), where semicircle 40 intersects respectively roads 14, 16, and 18 are possible locations.

In cases where routes that require a U-turn should be included, points where the roads intersect with a circle, instead of a semicircle, are possible locations. Furthermore, instead of intersecting points $P_1, P_2, \ldots, P_n$ themselves, road segments that include those points may be possible locations.

An optimal route from each possible location $P_1, P_2, \ldots, P_n$ to the destination may then be computed by either one of two different methods. The first method requires sequentially computing an optimal route from each possible location to the destination. The second method requires computing all possible optimal routes at once by parallel computation. In the parallel computation method, should two optimal routes, each of which starts from a different possible location, join together before reaching the destination, there is no need to compute each separately once they have joined. Therefore the second method requires less computing time, and the present embodiment employs it.

Should either method be used, constraints on computing an optimal route, such as the shortest distance from a starting point to a destination, etc., are the same as in conventional navigation systems.

A single optimal route is selected as follows from the plurality of optimal routes computed from each possible starting point in navigation system 24 of the present invention.

Figure 4:
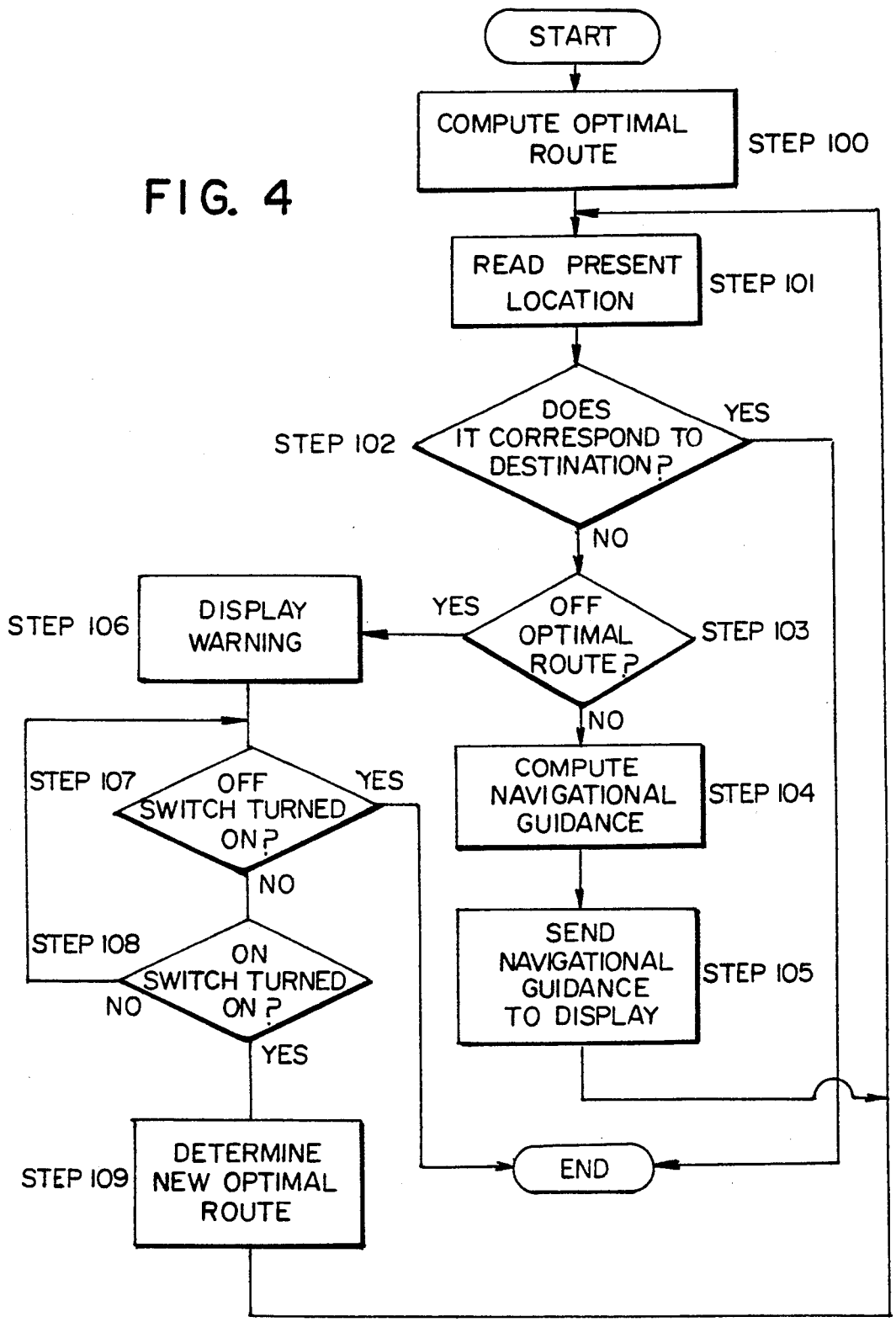
FIG. 4 is a flow chart illustrating computation of local navigational guidance.

Referring to FIG. 4, the program that computes local navigational guidance starts when ON switch 26a (see FIG. 3(C)) is turned on after vehicle 10's starting point and destination have been entered through input device 28. After the program starts, the optimal route is computed (Step 100), the present location is read in (Step 101), and a decision is made whether vehicle 10 has reached the destination, in other words, whether vehicle 10's present location corresponds to the destination (Step 102). If they correspond, the program ends.

Should vehicle 10 not have reached the destination, a decision is made whether or not vehicle 10 is off the optimal route (Step 103). If it is on the optimal route, local navigational guidance is computed (Step 104) and sent to display 38 to be displayed thereon (Step 105). Then the program returns to Step 101, and Steps 101 through 105 are repeated until vehicle 10 reaches the destination.

Should vehicle 10 be off the optimal route in Step 103, information that informs the driver that vehicle 10 is off the route is displayed (Step 106), as shown in FIG. 3(C). Then a decision is made whether or not OFF switch 26b has been activated (Step 107). If OFF switch 26b has been activated, the program ends. If OFF switch 26b has not been activated, a decision is made (Step 108 whether or not ON switch 26a has been activated. If ON switch 26a has not been activated, the program returns to Step 107.

If ON switch 26a has been activated, the program proceeds to determine a new optimal route (Step 109).

Figure 5:
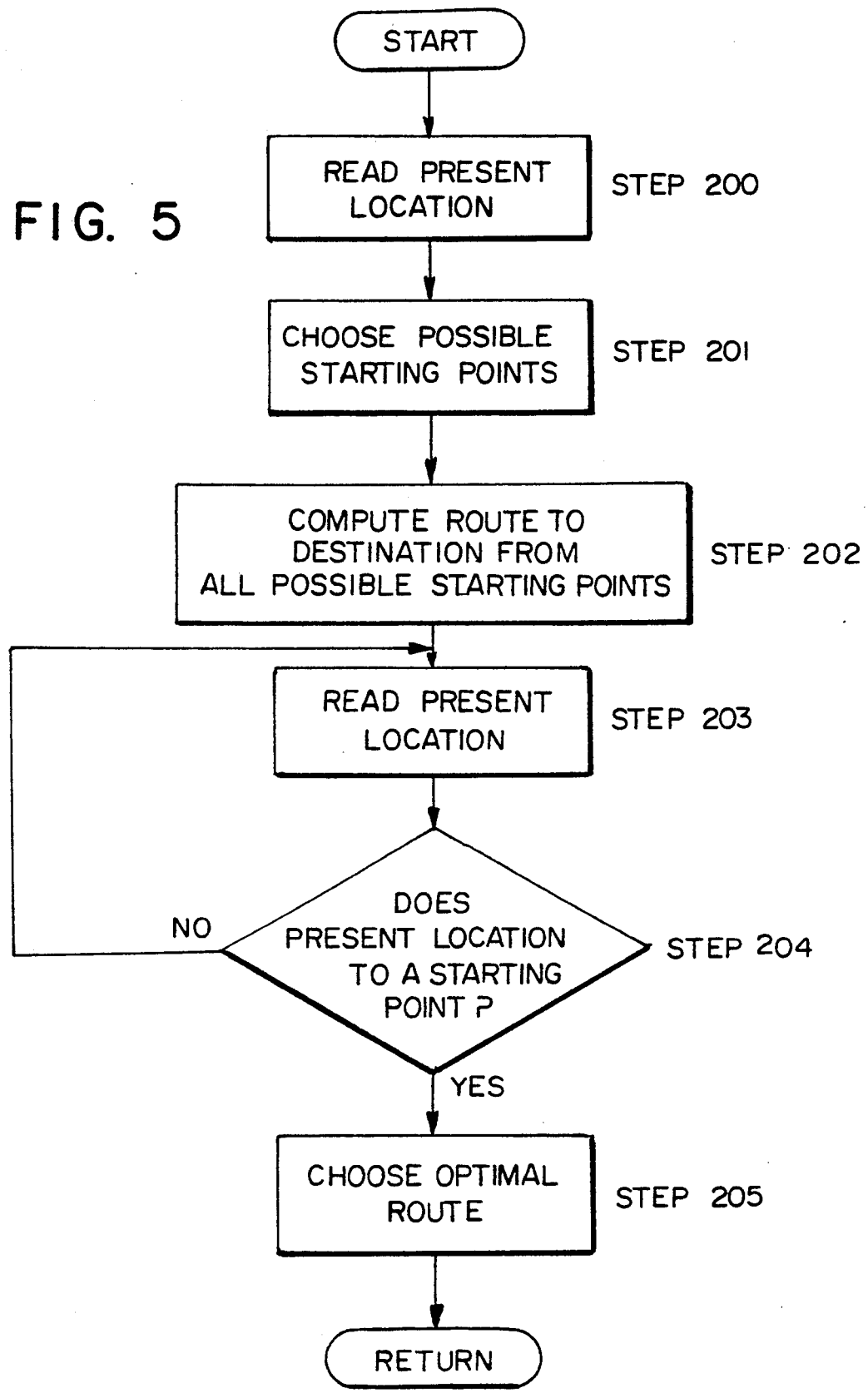
FIG. 5 is a flow chart illustrating computation of a new optimal route after a vehicle has deviated from the original optimal route.

Referring to FIG. 5, a subroutine determines a new optimal route after deviation from an original optimal route. When the program starts, the present location of vehicle 10 is read in (Step 200). Then possible new starting points for vehicle 10 are designated in accordance with its present location (Step 201). Under normal conditions, a plurality of locations are designated. Should there be no road in close proximity that intersects the road currently travelled by vehicle 10, however, only a single location may be designated as a possible new starting point.

Then respective new optimal routes are computed from the possible locations, which become the respective new starting points, to the destination (Step 202). Then the present location of vehicle 10 is read in (Step 203). The present location must be read in in Step 203 because it takes several seconds to compute new optimal routes, and vehicle 10 continues to move during this computation.

Next a decision is made whether the present location of vehicle 10 corresponds to one of the possible locations (Step 204). This decision step is repeated until vehicle 10 reaches one of the possible locations. When it has reached such a location, the optimal route from that location to the destination becomes the new optimal route, whose starting point is the location reached (Step 205).

Once the new optimal route is chosen, the program returns to Step 101 in the flow chart shown in FIG. 4, with navigational guidance being again conducted thereafter.

As explained above, according to the present embodiment, geographic points farther, from where vehicle 10 was when recomputation of an optimal route was commanded by route computation command switch 26, than a distance travelled by vehicle 10 while recomputation takes place are defined as possible new starting points after deviation. The optimal route from the geographic point actually reached by vehicle 10 becomes the new optimal route. Therefore vehicle 10 is kept from deviating again after computation of the new optimal route. As a plurality of geographic points that vehicle 10 may actually reach after the first deviation are designated, vehicle 10 eventually reaches one of them so that navigational guidance therefrom is resumed without fail.

Although the above embodiment of the present calls for manual operation of route computation command switch 26 to activate computation of a new optimal route after vehicle 10's first deviation, computation of a new route may be automatic when deviation is detected. In such a case, Step 109 may be carried out immediately after Step 103. Step 106 may also be carried out. If automatic recomputation is in effect, a message that reads "Optimal route being computed." is displayed, as shown in FIG. 3(B), instead of "Compute optimal route?", as shown in FIG. 3(C).

In the embodiment described above the new starting point, and the new optimal route from that point, is determined by where vehicle 10 actually arrives. A different method may be used to determine a new optimal route, as the following example shows.

Figure 6:
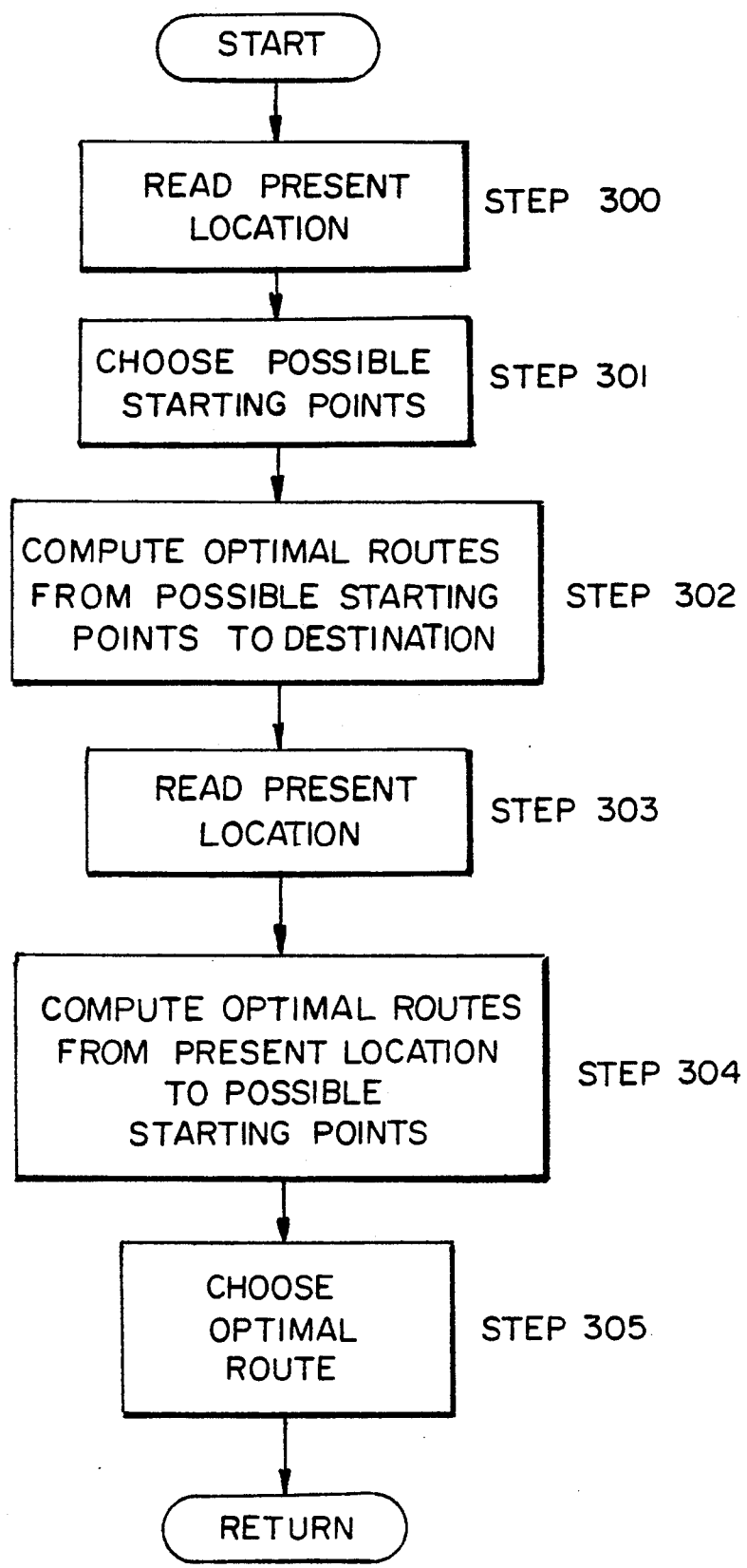
FIG. 6 is another flow chart illustrating computation of a new optimal route after a vehicle has deviated from the original optimal route.

Referring to FIG. 6, the flow chart illustrates a program for determining a new optimal route (Step 109). After the program starts, the steps of reading in vehicle 10's present location (Step 300), designating possible starting points (Step 301), computing optimal routes from those starting points (Step 302), and reading in again the present location of vehicle 10 (Step 303), are carried out sequentially in the same manner as Steps 200 through 203 in the flow chart of FIG. 5.

Then the optimal routes from the present location of vehicle 10 to the respective possible starting points are computed (Step 304). As the distance between vehicle 10's present location and each starting point is short, this computation is executed instantly.

Then a single optimal route is selected as follows (Step 305). First, optimal routes from the present location to the destination via each of the possible starting points are respectively computed. Each such route is computed by adding the optimal route from the present location to one of the starting points and the optimal route from the starting point in question to the destination. Then, from among the plurality of optimal routes from the present location to the destination via the respective starting points, the one which satisfies such a condition as the shortest distance, the shortest time, and/or the fewest number of turns is selected.

In summary, according to the first embodiment of the present invention, shaft sensor 32 and terrestrial magnetism sensor 34 cooperate to determine vehicle 10's present location. Microcomputer 36 computes the optimal route from a starting point to a destination from map data written into map data storage unit 30. In accordance with vehicle 10's present location, microcomputer 36 determines whether vehicle 10 is off or on the optimal route.

When microcomputer 36 determines that vehicle 10 has deviated from the optimal route, microcomputer 36 searches the map data in map data storage unit 30 to designate a plurality of possible starting points, which are respectively located on different roads and at a distance greater than a specified distance from the present location of vehicle 10. Then microcomputer 36 computes respective optimal routes from each possible starting point to the destination and chooses a single optimal route from among them.

The "specified distance" referred to above means a distance travelled by vehicle 10 while microcomputer 36 computes new optimal routes after the first deviation. This definition of "specified distance" is the same for both embodiments of the present invention.

According to the second embodiment of the present invention, shaft sensor 32 and terrestrial magnetism sensor 34 cooperate to determine vehicle 10's present location. Microcomputer 36 computes the optimal route from a starting point to a destination from map data written in map data storage unit 30. From vehicle 10's present location, microcomputer 36 detects whether vehicle 10 is off or on the optimal route.

When microcomputer 36 detects that vehicle 10 has deviated from the optimal route, display 38 displays information showing that vehicle 10 is off the optimal route. When the driver, having seen the displayed information, manually activates route computation command switch 26, it causes microcomputer 36 to search the map data and select a plurality of possible starting points $P_1, P_2, \ldots, P_n$. These points are respectively located on different roads at a distance greater than a specified distance from the present location of vehicle 10. Also in response to the activation of route computation command switch 26, microcomputer 36 computes respective optimal routes from the possible starting points to the destination and chooses a single optimal route from among them.

As explained above, a navigation system according to the present invention can prevent a vehicle from deviating from an optimal route immediately after recomputation of the optimal route is completed, because the system selects a plurality of geographic points which are at a distance greater than a specified distance from the present location of the vehicle at the time of its deviation from the original optimal route, and a single new optimal route is selected from among the plurality of optimal routes that originate from the plurality of geographic points.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle navigation system, which comprises:
   means for storing and retrieving map data;
   first means for detecting a present location of a vehicle;
   means for computing from the map data an original optimal route for the vehicle from a starting point to a destination;
   second means for detecting a deviation of said vehicle from said original optimal route;
   first means for selecting a plurality of possible new starting points by searching said map data;
      each of said new starting points being located on a different road;
      each of said new starting points being located at a distance greater than a specified distance from said present location of said vehicle;
   said means for computing including means for computing a plurality of new optimal routes from each of said possible new starting points to said destination;
   second means for selecting a single new optimal route from among said plurality of new optimal routes; and
   said second means for selecting including means for selecting said single new optimal route when said second detecting means detects that said vehicle is off said original optimal route.

2. A vehicle navigation system as in claim 1, wherein:
   said second means for selecting selects said new optimal route from said plurality of new optimal routes; and
   said selected new optimal route is the route whose starting point is actually reached by said vehicle.

3. A vehicle navigation system as in claim 1, wherein:
   said means for computing includes means for making a second computation of a plurality of optimal routes from said present location of said vehicle to each of said possible new starting points, where said present location is a location of said vehicle at a time of completion of said first computation; and
   said second means for selecting selects said single new optimal route from among said plurality of new optimal routes from said present location to said destination via said possible new starting points.

4. A vehicle navigation system as in claim 1, wherein said means for storing and retrieving includes a remote computer database.

5. A vehicle navigation system as in claim 1, wherein said means for computing includes a microcomputer.

6. A vehicle navigation system as in claim 1, wherein said first means for detecting includes in combination a shaft sensor and a terrestrial magnetism sensor.

7. A vehicle navigation system as in claim 1, wherein said second means for detecting includes in combination a shaft sensor, a terrestrial magnetism sensor, and a microcomputer.

8. A vehicle navigation system as in claim 1, wherein said first means for selecting includes a microcomputer.

9. A vehicle navigation system as in claim 1, wherein said second means for selecting includes a microcomputer.

10. A vehicle navigation system as in claim 1, further including means for displaying said map data.

11. A vehicle navigation system as in claim 10, wherein said means for displaying includes an LCD.

12. A vehicle navigation system as in claim 10, wherein said means for displaying includes a CRT.

13. A vehicle navigation system, which comprises:
   means for storing and retrieving map data;
   first means for detecting a present location of a vehicle;
   means for computing from said map data an original optimal route for said vehicle from a starting point to a destination;
   second means for detecting a deviation of said vehicle from said original optimal route;
   means, responsive to said second means for detecting, for displaying an indication that said vehicle is off said original optimal route;
   means for sending a command signal manually;
   first means, responsive to said command signal, for selecting a plurality of possible new starting points by searching said map data;
      each of said new starting points being located on a different road;
      each of said new starting points being located at a distance greater than a specified distance from said present location of said vehicle;
   said means for computing including means for making a first computation of a plurality of new optimal routes from each of said possible new starting points to said destination;
   second means for selecting a single new optimal route from among said plurality of new optimal routes; and
   said second means for selecting including means for selecting said single new optimal route when said second means for detecting detects that said vehicle is off said original optimal route.

14. A vehicle navigation system as in claim 13, wherein:
   said second means for selecting selects said new optimal route from said plurality of new optimal routes; and
   said selected new optimal route is the route whose starting point is actually reached by said vehicle.

15. A vehicle navigation system as in claim 13, wherein:

said means for computing is effective for making a second computation of a plurality of optimal routes from said present location of said vehicle to each of said possible new starting points;

said present location is a location of said vehicle at a time of completion of said first computation; and said second means for selecting selects said single new optimal route from among said plurality of new optimal routes from said present location to said destination via said possible new starting points.

16. A vehicle navigation system as in claim 13, wherein said means for storing and retrieving includes a remote computer database.

17. A vehicle navigation system as in claim 13, wherein said means for computing includes a microcomputer.

18. A vehicle navigation system as in claim 13, wherein said first means for detecting includes in combination a shaft sensor and a terrestrial magnetism sensor.

19. A vehicle navigation system as in claim 13, wherein said second means for detecting includes in combination a shaft sensor, a terrestrial magnetism sensor, and a microcomputer.

20. A vehicle navigation system as in claim 13, wherein said first means for selecting includes a microcomputer.

21. A vehicle navigation system as in claim 13, wherein said second means for selecting includes a microcomputer.

22. A vehicle navigation system as in claim 13, further including means for displaying said map data.

23. A vehicle navigation system as in claim 22, wherein said means for displaying includes an LCD.

24. A vehicle navigation system, which comprises:
a CD ROM for storing and retrieving map data;
a shaft sensor;
a terrestrial magnetism sensor;
said shaft sensor and said terrestrial magnetism sensor sending signals that determine a present location of a vehicle;
a microcomputer for computing from said map data an original optimal route for said vehicle from a starting point to a destination;
said signals from said shaft sensor and said terrestrial magnetism sensor permitting said microcomputer to detect a deviation of said vehicle from said original optimal route;
said microcomputer including means for selecting a plurality of possible new starting points by searching said map data;
each of said new starting points being located on a different road;
each of said new starting points being located at a distance greater than a specified distance from said present location of said vehicle;
said microcomputer including means for computing a plurality of new optimal routes from each of said possible new starting points to said destination;
said microcomputer including means for selecting a single new optimal route from among said plurality of new optimal routes; and
said microcomputer including means for selecting said single new optimal route when said shaft sensor, said terrestrial magnetism sensor, and said microcomputer cooperate to detect that said vehicle is off said original optimal route.

25. A vehicle navigation system, which comprises:
a CD ROM for storing and retrieving map data;
a shaft sensor;
a terrestrial magnetism sensor;
said shaft sensor and said terrestrial magnetism sensor sending signals that determine a present location of a vehicle;
a microcomputer for computing from said map data an original optimal route for said vehicle from a starting point to a destination;
said signals from said shaft sensor and said terrestrial magnetism sensor permitting said microcomputer to detect a deviation of said vehicle from said original optimal route;
said microcomputer including means for signalling said deviation;
a CRT display for displaying information;
said CRT including means for indicating that said vehicle is off said original optimal route when said microcomputer signals said deviation;
a manually operated switch for sending a command signal;
said microcomputer including means for selecting a plurality of possible new starting points by searching said map data;
each of said new starting points being located on a different road;
each of said new starting points being located at a distance greater than a specified distance from said present location of said vehicle;
said microcomputer being responsive to said command signal;
said microcomputer including means for computing a plurality of new optimal routes from each of said possible new starting points to said destination;
said microcomputer including means for selecting a single new optimal route from among said plurality of new optimal routes; and
said microcomputer including means for selecting said single new optimal route when said shaft sensor, said terrestrial magnetism sensor, and said microcomputer cooperate to detect that said vehicle is off said original optimal route.

* * * * *